United States Patent
Nakamura et al.

(10) Patent No.: US 10,408,611 B2
(45) Date of Patent: Sep. 10, 2019

(54) MONITORING APPARATUS INCLUDING SENSORS

(71) Applicant: FANUC CORPORATION, Yamanashi (JP)

(72) Inventors: Minoru Nakamura, Yamanashi (JP); Atsushi Watanabe, Yamanashi (JP); Yuuki Takahashi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/167,555

(22) Filed: Oct. 23, 2018

(65) Prior Publication Data

US 2019/0128667 A1 May 2, 2019

(30) Foreign Application Priority Data

Oct. 27, 2017 (JP) .................. 2017-208182

(51) Int. Cl.
*G01B 11/28* (2006.01)
*G01B 9/02* (2006.01)

(52) U.S. Cl.
CPC .......... *G01B 11/28* (2013.01); *G01B 9/02041* (2013.01); *G01B 9/02089* (2013.01)

(58) Field of Classification Search
CPC . G01B 11/28; G01B 9/02041; G01B 9/02089
USPC .................................. 356/614–640
See application file for complete search history.

(56) References Cited

U.S. PATENT DOCUMENTS

2003/0165268 A1 9/2003 Franz

FOREIGN PATENT DOCUMENTS

| JP | S59-60601 U | 4/1984 |
|---|---|---|
| JP | H8-122446 A | 5/1996 |
| JP | H9-257919 A | 10/1997 |
| JP | 2016-105048 A | 6/2016 |
| KR | 10-2005-0105394 A | 11/2005 |

*Primary Examiner* — Tri T Ton
(74) *Attorney, Agent, or Firm* — Hauptman Ham, LLP

(57) ABSTRACT

An object monitoring apparatus including sensors. The apparatus includes first and second sensors that measure mutually corresponding spatial areas; a first judging unit that judges whether an object is present in a predetermined monitored area, based on measurement data of the first sensor; a second judging unit that judges whether an object is present in an extended area extending toward an outside of the monitored area, based on measurement data of the second sensor; a first signal-output unit that outputs a first object-sensing signal, when the first judging unit judges that an object is present in the monitored area; and a second signal-output unit that outputs a second object-sensing signal, when the first judging unit judges that an object is present in the monitored area and in a case where the second judging unit judges that an object is present in the extended area.

15 Claims, 14 Drawing Sheets

MONITORING APPARATUS INCLUDING SENSORS

RELATED APPLICATIONS

The present application claims priority of Japanese Patent Application No. 2017-208182, filed on Oct. 27, 2017, the disclosure of which is hereby incorporated by reference herein in its entirety.

BACKGROUND OF THE INVENTION

1. Field of the Invention

The present invention relates to an object monitoring apparatus including a plurality of sensors.

2. Description of the Related Art

An object monitoring apparatus that monitors an object present in a spatial area by using a sensor for measuring the spatial area is known. Japanese Unexamined Patent Publication No. 9-257919 (JP H9-257919 A), for example, discloses an area monitoring method and an area monitoring apparatus, which are configured to monitor an object in a desired area by using a spread-spectrum radar device. JP H9-257919 A describes a configuration wherein a plurality of radars monitor respective areas partially different from each other, and a configuration wherein a plurality of radars monitor areas identical to each other. On the other hand, Japanese Unexamined Patent Publication No. 8-122446 (JP H8-122446 A) discloses an object detection apparatus configured to detect the presence of an object in a monitored area by using a sensor, such as a pyroelectric sensor. The object detection apparatus of JP H8-122446 A includes a judging means that judges the presence or absence of an object based on the detection output of a sensor, and a signal processing means that generates a signal indicating a danger at the instant when the sensor fails, regardless of the result of judgement of the presence or absence of an object.

SUMMARY OF THE INVENTION

A mechanical system including an object monitoring apparatus may have a configuration wherein, in order to deal with a situation such that an object in a monitored area cannot be detected due to unexpected failure and thereby to improve the reliability and safety of a monitoring operation, a plurality of object monitoring apparatuses that measure mutually corresponding spatial areas are provided and a common monitored area is redundantly monitored by the object monitoring apparatuses. However, in this configuration, there may be several situations such that: sensors provided in the respective object monitoring apparatuses have specifications different from each other; even if sensors have specifications identical to each other, there are errors with respect to designed values, such as errors in measurement accuracy or measurement resolution, errors in an installation position or installation posture in an environment, etc.; the object monitoring apparatuses have a difference in performance due to internal or external factors, such as a difference in acquisition timing or processing speed of measurement data in the respective sensors, a difference in environmental condition (e.g., temperature or vibration) of the respective installation positions, etc. In the above situations, there are concerns that the results of processing of the object monitoring apparatuses may have a discrepancy, which may damage the reliability or safety of a monitoring operation.

One aspect of the present disclosure provides an object monitoring apparatus including a first sensor that measures a spatial area and a second sensor that measures a spatial area corresponding to the spatial area measured by the first sensor; a first judging unit that judges whether an object is present in a monitored area defined within the spatial area, based on measurement data of the first sensor; a second judging unit that judges whether an object is present in an extended area extending toward an outside of the monitored area to a predetermined outside range, based on measurement data of the second sensor; a first signal-output unit that outputs a first object-sensing signal as a result of judgement of the monitored area based on the measurement, data of the first sensor, when the first judging unit judges that an object is present in the monitored area; and a second signal-output unit that outputs a second object-sensing signal as a result of judgement of the monitored area based on the measurement data of the second sensor, when the first judging unit judges that an object is present in the monitored area and in a case where the second judging unit judges that an object is present in the extended area.

Another aspect of the present disclosure provides an object monitoring apparatus including a first sensor that measures a spatial area and a second sensor that measures a spatial area corresponding to the spatial area measured by the first sensor; a first judging unit that judges whether an object is present in a monitored area defined within the spatial area and whether an object is present in an extended area extending toward an outside of the monitored area to a predetermined outside range, based on measurement data of the first sensor; a second judging unit that judges whether an object is present in the monitored area and whether an object is present in the extended area, based on measurement of the second sensor; a first signal-output unit that outputs a first object-sensing signal as a result of judgement of the monitored area executed by the first judging unit, when the first judging unit judges that an object is present in the monitored area; a second signal-output unit that outputs a second object-sensing signal as a result of judgement of the monitored area executed by the second judging unit, when the second judging unit judges that an object is present in the monitored area; and a judgement adjusting unit, that makes the second signal-output, unit output the second object-sensing signal, when the first judging unit judges that an object is present in the monitored area and in a case where the second judging unit judges that an object is present in the extended area, and makes the first signal-output unit output the first object-sensing signal, when the second judging unit judges that an object is present in the monitored area and in a case where the first judging unit judges that an object is present in the extended area.

In the object monitoring apparatus according to the first aspect, a common monitored area is redundantly monitored by using the first and second sensors, which improves the reliability and safety of a monitoring operation for monitoring the monitored area. In a conventional mechanical system configuration including a plurality of object monitoring apparatuses, there may be several situations such that: sensors provided in the respective object monitoring apparatuses have specifications different from each other; even if sensors have specifications identical to each other, there are errors with respect to designed values, such as errors in measurement accuracy or measurement resolution, errors in an installation position or installation posture in an environment, etc.; the object monitoring apparatuses have a difference in performance due to internal or external factors, such as a difference in acquisition timing or processing speed of measurement data in the respective sensors, a difference in environmental condition (e.g., temperature or vibration) of respective installation sites, etc. Contrary to this, the object monitoring apparatus according to one aspect, has a configuration wherein a monitoring operation performed by the first sensor for monitoring the monitored area is considered as a reference operation and the second sensor is designed to measure the extended area extending toward the outside of the monitored area to the predetermined outside range, so that even when the sensors involve the aforementioned difference in specification, errors, difference in performance, etc., it is possible to absorb the discrepancy, which may occur between the measurement data or processing results of the sensors in the conventional system, by a margin monitoring operation of the second sensor performed while ensuring a margin or flexibility corresponding to the predetermined outside range. Therefore, according to the object monitoring apparatus, it is possible to resolve, incongruity, due to errors, difference in performance, etc., between the monitoring operations performed by the first and second sensors for monitoring the monitored area, and thus to ensure the reliability and safety of the monitoring operations.

The object monitoring apparatus according to the other aspect provides effects equivalent to the aforementioned effects.

BRIEF DESCRIPTION OF THE DRAWINGS

The objects, features and advantages of the present disclosure will become more apparent from the following description of the embodiments in connection with the accompanying drawings, wherein.

DETAILED DESCRIPTION

Figure 1:
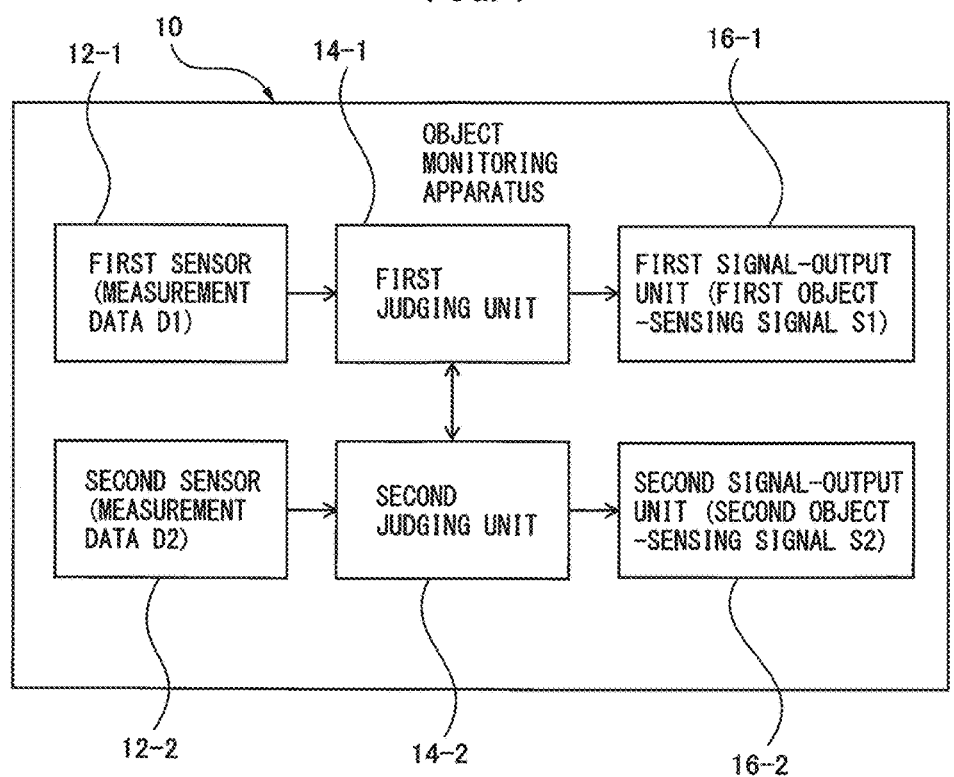
FIG. 1 is a functional block diagram illustrating a configuration of one embodiment of an object monitoring apparatus.

Embodiments of the present disclosure will be described below with reference to the accompanying drawings. The same reference numerals denote corresponding components throughout the drawings.

Figure 2:
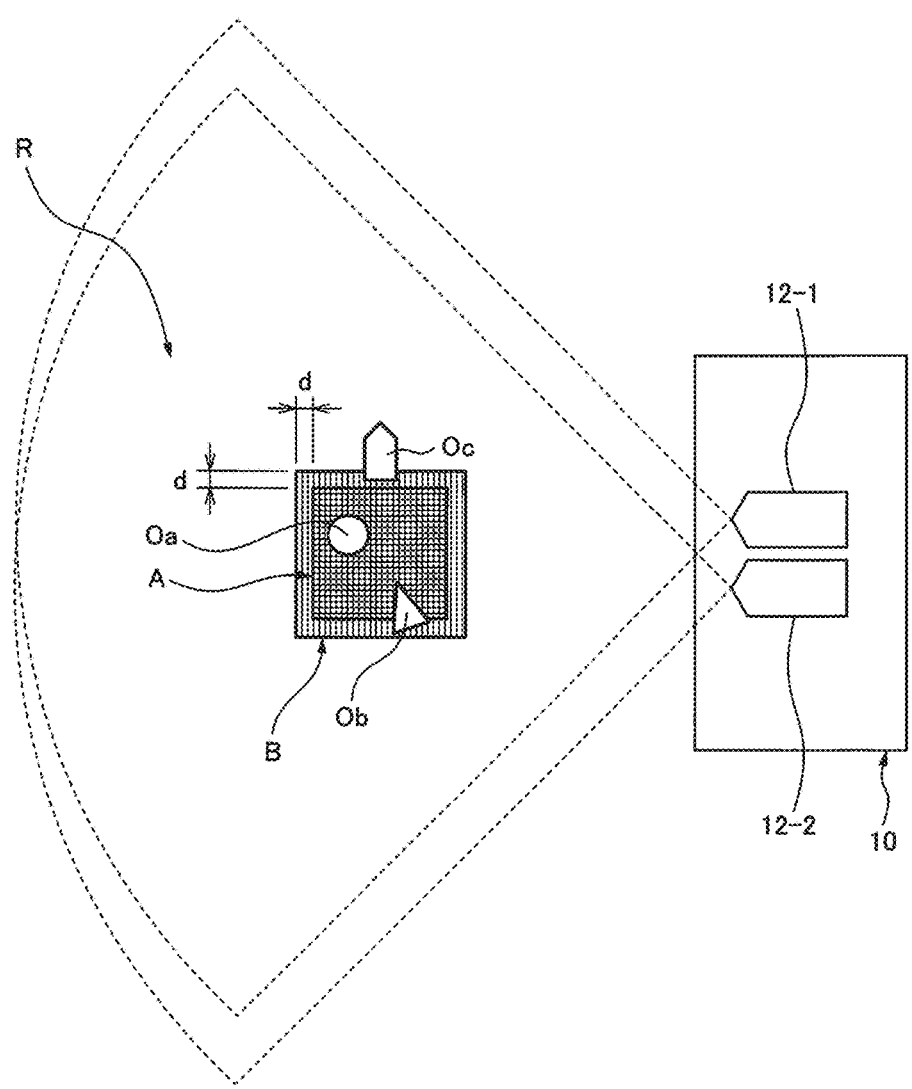
FIG. 2 is a diagram schematically illustrating one exemplary spatial arrangement of the object monitoring apparatus, together with exemplary monitored and extended areas.
Figure 3:
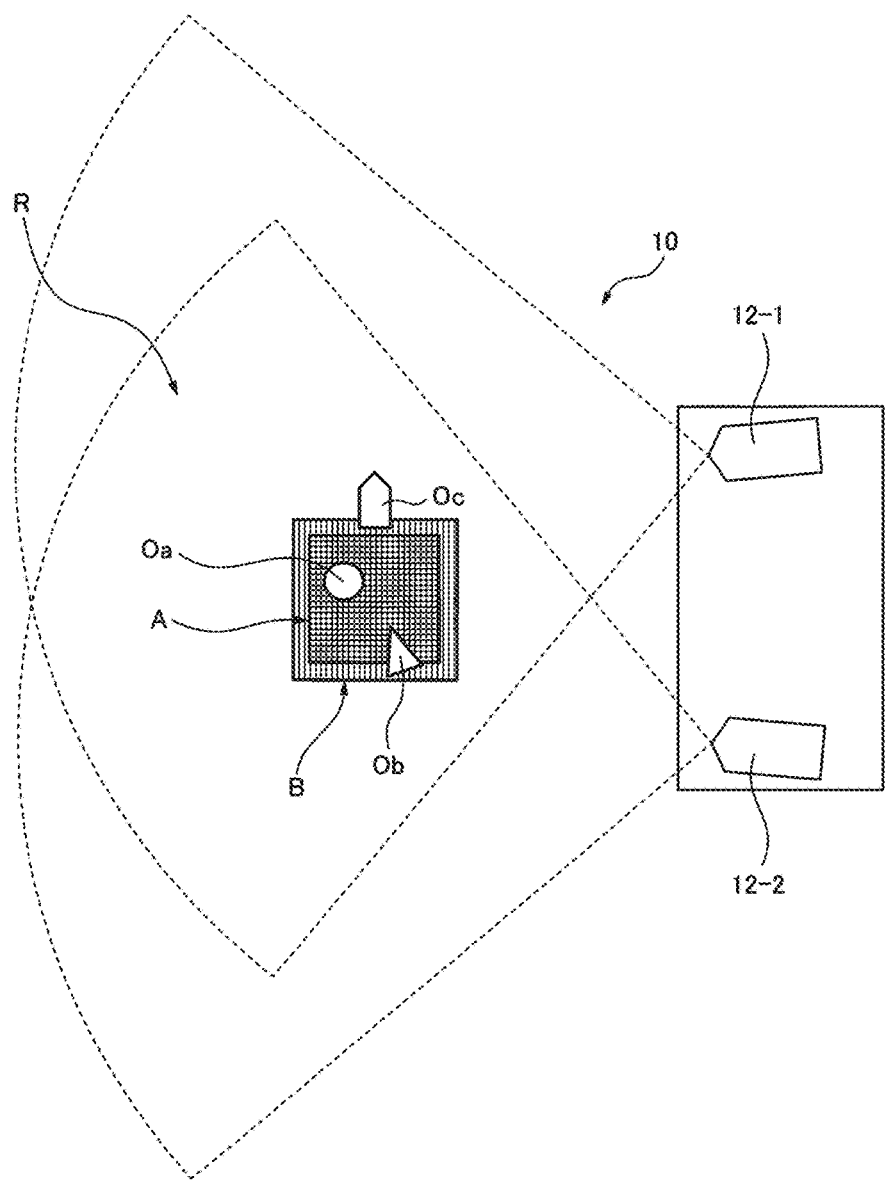
FIG. 3 is a diagram schematically illustrating another exemplary spatial arrangement, of the object monitoring apparatus, together with exemplary monitored and extended areas.

FIG. 1 illustrates, by functional blocks, a configuration of one embodiment of an object monitoring apparatus 10. FIGS. 2 and 3 schematically illustrate the examples of the spatial arrangement of the object monitoring apparatus 10. The object monitoring apparatus 10 includes a first sensor 12-1 that measures a spatial area R and a second sensor 12-2 that measures a spatial area R corresponding to the spatial area R measured by the first sensor 12-1; a first judging unit 14-1 that judges whether an object (objects Oa, Ob, and Oc in FIGS. 2 and 3; some sort of "material" will be collectively referred to as "object O" hereinafter) is present in a monitored area A defined within the spatial area R, based on measurement data D1 of the first sensor 12-1; a second judging unit 14-2 that judges whether an object O is present in an extended area B extending toward the outside of the monitored area A to a predetermined outside range "d", based on measurement data D2 of the second sensor 12-2; a first signal-output unit 16-1 that outputs a first object-sensing signal S1 as a result of judgement of the monitored area A based on the measurement data of the first sensor 12-1, when the first judging unit 14-1 judges that an object O is present in the monitored area A; and a second signal-output unit 16-2 that outputs a second object-sensing signal S2 as a result of judgement of the monitored area A based on the measurement data of the second sensor 12-2, when the first judging unit 14-1 judges that an object O is present in the monitored area A and in the case where the second judging unit 14-2 judges that an object O is present in the extended area B.

The object monitoring apparatus 10 may further be configured such that the second judging unit 14-2 judges whether an object O is present in the monitored area A, based on measurement data D2 of the second sensor 12-2; and the first judging unit 14-1 judges whether an object O is present in the extended area B, based on measurement data D1 of the first sensor 12-1. In this configuration, the second signal-output unit 16-2 outputs a second object-sensing signal S2 as a result of judgement of the monitored area A based on the measurement data of the second sensor 12-2, when the second judging unit 14-2 judges that an object O is present in the monitored area A. The first signal-output unit 16-1 outputs a first object-sensing signal S1 as a result of measurement of the monitored area A based on the measurement data of the first sensor 12-1, when the second judging unit 14-2 judges that an object O is present in the monitored area A and in the case where the first judging unit 14-1 judges that an object O is present in the extended area B.

Each of the first sensor 12-1 and the second sensor 12-2 has a configuration of a ranging sensor that three-dimensionally measures a distance and a direction, from the sensor to an object present in a spatial area. A ranging sensor that can be employed in the present disclosure is, for example, a triangulation-type measurement device including a light-projecting optical system and a light-receiving optical system; a stereoscope-type measurement device using two image sensing devices (e.g., CCD cameras); a radar using a reflection delay time of a radio wave; a TOF sensor using a reflection delay time of light (laser or near infrared light); etc. The present disclosure does not limit the configuration of the ranging sensor. Also, there are various methods for judging whether an arbitrary point (or three-dimensional coordinates) is present within a predetermined three-dimensional area in a space. The present disclosure does not limit the judging method.

The first sensor 12-1 and the second sensor 12-2 have, for example, identical specifications, and three-dimensionally measure the corresponding spatial area R. The first sensor 12-1 can measure a distance and a direction, from the first sensor 12-1 to the object O present in the spatial area R. The second sensor 12-2 can measure a distance and a direction, from the second sensor 12-2 to the object O present in the spatial area R.

As illustrated in, e.g., FIG. 2, the first sensor 12-1 and the second sensor 12-2 may be disposed so as to face in a mutually identical direction (i.e., the fields of view of the sensors 12-1, 12-2 extend in substantially the same directions). In this configuration, when the first sensor 12-1 and the second sensor 12-2 are disposed as close to each other as possible, relatively large spatial area R redundantly measured by the sensors 12-1, 12-2 can be obtained. When the first and second sensors 12-1, 12-2 having identical specifications are disposed so as to be oriented in the identical direction from substantially identical positions, images of the object O measured by the sensors 12-1, 12-2 are substantially identical to each other, and it is possible to prevent, for example, a situation in which one of two sensors becomes incapable of measuring the object O due to obstacles, etc. In the present disclosure, the "identical direction" configuration means that the mechanical system is designed so that the first sensor 12-1 and the second sensor 12-2 are disposed so as to face in a completely identical direction but permits errors in the orientation of the sensors, which may be caused during manufacture or installation.

Contrary to the above, as illustrated in, e.g., FIG. 3, the first sensor 12-1 and the second sensor 12-2 may be disposed so as to face in mutually different directions (i.e., the fields of view of the sensors 12-1, 12-2 extend in directions angled with each other). This configuration is effective in the case where the first sensor 12-1 and the second sensor 12-2 are spaced apart from each other. When the relative angle between the sensor orientations is set correspondingly to the fields of view (illustrated by broken-line sectors) or the separation distance, of the sensors 12-1, 12-2, relatively large spatial area R redundantly measured by the sensors 12-1, 12-2 can be obtained.

As illustrated in FIGS. 2 and 3, the monitored area A as a common area monitored by using each of the first sensor 12-1 and the second sensor 12-2 is defined in advance at an arbitrary position in the spatial area R. The monitored area A is a limited spatial area having an arbitrarily-shaped three-dimensional extent. The object monitoring apparatus 10 can monitor the motion or movement of the object O present in the monitored area A, by using each of the measurement data D1 and D2 of the first sensor 12-1 and the second sensor 12-2. The monitored area A may have a simple shape, such as a cube (illustrated), a rectangular parallelepiped, a sphere, etc., or any other three-dimensional shapes. The shape, size, position, etc., of the monitored area A may be set as appropriate by, for example, a designer of a monitoring mechanical system provided with the object monitoring apparatus 10.

Figure 4:
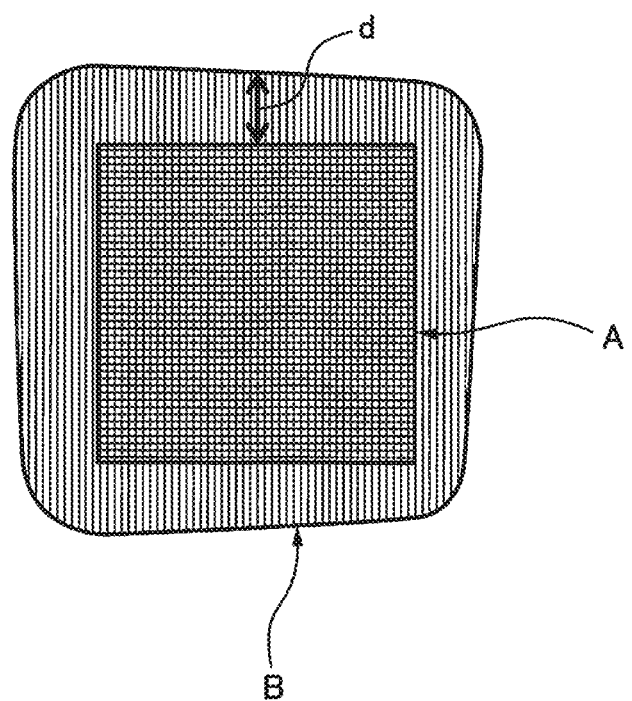
FIG. 4 is a diagram schematically illustrating modified monitored and extended areas.

As illustrated in FIGS. 2 and 3, the extended area B is a limited spatial area having a three-dimensional extent shaped to extend toward the outside of the monitored area A to the predetermined outside range d in the spatial area R. The illustrated extended area B has a shape obtained by directly expanding the monitored area A by the predetermined outside range d (i.e., a shape containing the monitored area A). The extension from the monitored area A to the extended area B may be configured to extend the monitored area by the range d uniformly in all three-dimensional directions as illustrated, or extend the monitored area wider in a predetermined direction than in other directions (i.e., by the range d that varies depending on the direction) as needed, as illustrated in, e.g., FIG. 4. Further, an extended area B having a predetermined shape may be preliminarily defined when a monitored area A is defined within the spatial area R. Alternatively, a required predetermined outside range d may be stored in advance, and a range obtained by extending the monitored area A by the predetermined outside range d is handled as an extended area B in an ex-post manner.

Figure 5A:
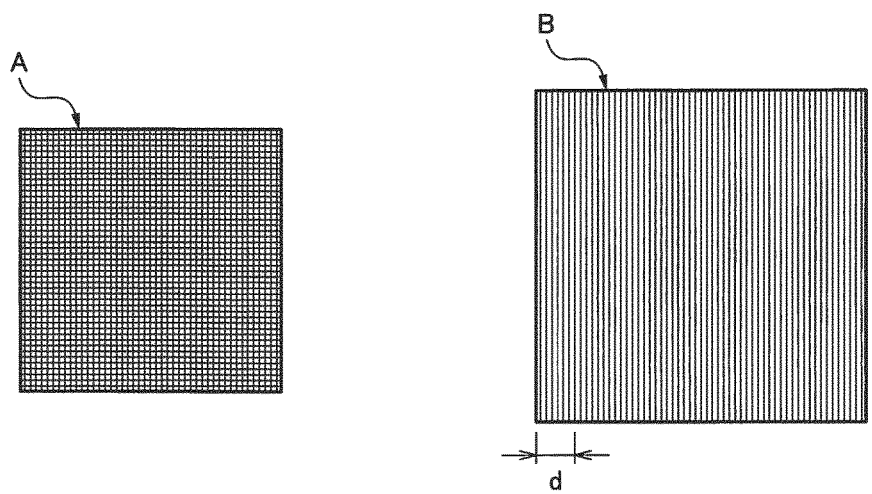
FIG. 5A is a diagram schematically illustrating examples of monitored area and extended area as an exploded view.
Figure 5B:
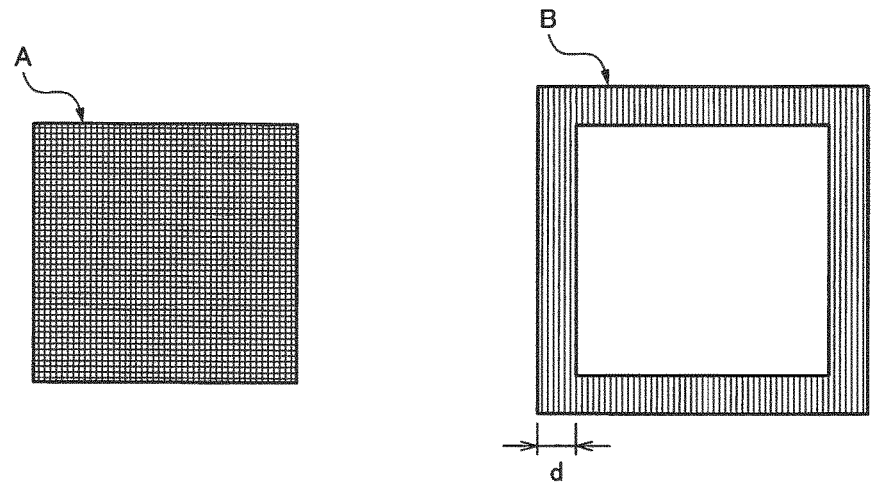
FIG. 5B is a diagram schematically illustrating other examples of monitored area and extended area as an exploded view.

FIG. 5A is a schematic diagram illustrating the monitored area A and the extended area B, illustrated in FIGS. 2 and 3, as an exploded view while maintaining the dimensional relationship thereof. FIG. 5B is a schematic diagram corresponding to FIG. 5A and illustrating other examples of the monitored area A and the extended area B, illustrated in FIGS. 2 and 3, as an exploded view. In the case where the object monitoring apparatus 10 is configured such that each of the first and second judging units 14-1, 14-2 judges the presence or absence of an object O in both of the monitored area A and the extended area B, the extended area B may have not only a shape (FIG. 5A) containing the monitored area A but also a shape (FIG. 5B) three-dimensionally surrounding the monitored area A in a range defined by the predetermined outside range d.

In either of a configuration wherein the extended area B contains the monitored area A and a configuration wherein the extended area B surrounds the monitored area A, a designer of a monitoring mechanical system provided with the object monitoring apparatus 10 may, for example, set as appropriate the shape, size, position, etc., of the extended area B, based on the monitored area A while considering errors, differences in performance, etc., between the sensors (as described later). In this context, the extended area B may have a simple shape, such as a cube, a rectangular parallelepiped, a sphere, etc., or any other three-dimensional shapes. Further, as a method for more accurately determining the predetermined outside range d, an "extending distance function" defined in the present disclosure may be used. When the extending distance function is used, the shape of the extended area B illustrated in FIG. 4, for example, can be optimized in accordance with the position, shape, etc., of the monitored area A defined in the spatial area R. The extending distance function will be described in more detail later.

Each of the first judging unit 14-1 and the second judging unit 14-2 may be implemented as software for making a processor, such as a CPU (Central Processing Unit) of a computer, function. Alternatively, each of the first judging unit 14-1 and the second judging unit 14-2 may be implemented as hardware, such as a processor capable of executing some or all processes of the software. The first judging unit 14-1 acquires the measurement data D1 of the first sensor 12-1 and the position and shape of the monitored area A, executes processing, such as a three-dimensional coordinate transformation, on the measurement data D1 as appropriate, and judges whether an object O measured by the first sensor 12-1 is identified in the monitored area A or not. The second judging unit 14-2 acquires the measurement data D2 of the second sensor 12-2 and the position and shape of the extended area B, executes processing, such as a three-dimensional coordinate transformation, on the measurement data D2 as appropriate, and judges whether an object O measured by the second sensor 12-2 is identified in the extended area B or not. Analogously, the first judging unit 14-1 may acquire the measurement data D1 of the first sensor 12-1 and the position and shape of the extended area B, and judge whether an object O measured by the first sensor 12-1 is identified in the extended area B or not. Also, the second judging unit 14-2 may acquire the measurement data D2 of the second sensor 12-2 and the position and shape of the monitored area A, and judge whether an object O measured by the second sensor 12-2 is identified in the monitored area A or not.

The judgment of the presence or absence of an object in the extended area B may be performed by, for example, generating spatial coordinate data representing the extended area B, and judging whether coordinates of the measurement data D1 or D2 of the first sensor 12-1 or the second sensor 12-2 are identified within the extended area B or not. Alternatively, without generating spatial coordinate data representing the extended area B, the first judging unit 14-1 or the second judging unit 14-2 may determine a distance between the monitored area A and an object O present outside the monitored area A based on the measurement data D1 or D2, and judge that the object O is present in the extended area B when the determined distance is equal to or less than the predetermined outside range d. In the latter configuration, there is no need to previously define an extended area B having a predetermined shape in the spatial area R.

Each of the first signal-output unit 16-1 and the second signal-output unit 16-2 may be implemented as software for making a processor, such as a CPU (Central Processing Unit) of a computer, function. Alternatively, each of the first signal-output unit 16-1 and the second signal-output unit 16-2 may be implemented as hardware, such as a processor capable of executing some or all processes of the software. The first signal-output unit 16-1 outputs the first object-sensing signal S1 in accordance with the result of judgement executed by the first judging unit 14-1 (and the second judging unit 14-2 as needed). The second signal-output unit 16-2 outputs the second object-sensing signal S2 in accordance with the result of judgement executed by the second judging unit 14-2 (and the first judging unit 14-1 as needed). The first signal-output unit 16-1 and the second signal-output unit 16-2 may output the first object-sensing signal S1 and the second object-sensing signal S2 to an external device (not illustrated), such as a signal processing device, a display device, an alarm device, etc.

In the object monitoring apparatus 10, the common monitored area A is redundantly monitored by using the first sensor 12-1 and the second sensor 12-2, and thereby the reliability and safety of a monitoring operation for monitoring the monitored area A is improved. In a conventional mechanical system configuration wherein a plurality of object monitoring apparatuses monitor a predetermined area, there may be several situations such that: sensors provided in the respective object monitoring apparatuses have specifications different from each other; even if sensors have specifications identical to each other, there are errors with respect to designed values, such as errors in measurement accuracy or measurement resolution, errors in an installation position or installation posture in an environment, etc.; the object monitoring apparatuses have a difference in performance due to internal or external factors, such as a difference in acquisition timing or processing speed of measurement data in the respective sensors, a difference in environmental condition (e.g., temperature or vibration) of respective installation sites, etc. In the above situations, there are concerns that the measurement data of the sensors or the results of processing thereof may have a discrepancy, which may damage the reliability or safety of a monitoring operation. In addition, it is hard to determine whether the discrepancy generated in the measurement data or the processing results is due to the aforementioned errors or difference in performance, etc., or whether the discrepancy is due to an apparatus malfunction. Consequently, it is concerned that even when the discrepancy is caused by a permissible error or difference in performance, an apparatus malfunction is estimated and an excess coping is performed. The object monitoring apparatus 10 can solve such a problem, as will be described below.

Referring again to FIGS. 2 and 3, the monitoring operation of the object monitoring apparatus 10 will be described. The first judging unit 14-1 judges that an object O is present in the monitored area A, in the case where an object O measured by the first sensor 12-1 is identified in the monitored area A. The first signal-output unit 16-1 operates, as a reference operation thereof, to receive the judgement result of the first judging unit 14-1 such that the object is present in the monitored area A, and to output a first object-sensing signal S1 as a consequence of measurement of the monitored area A performed by the first sensor 12-1. When the first judging unit 14-1 judges that an object O measured by the first sensor 12-1 is not present in the monitored area A, the first signal-output unit 16-1 does not output the first object-sensing signal S1.

For example, in the arrangements depicted in FIGS. 2 and 3, the first judging unit 14-1 judges that an object O is present in the monitored area. A and the first signal-output unit 16-1 outputs a first object-sensing signal S1 as the reference operation, in the case where there is an object Oa, the whole of which is identified in the monitored area A, and also in the case where there is an object Ob, a part of which is identified in the monitored area A. On the other hand, in the case where there is only an object Oc, the whole of which is identified outside the monitored area A, the first judging unit 14-1 judges that an object O is not present in the monitored area A, and the first signal-output unit 16-1 does not output the first object-sensing signal S1.

The second judging unit 14-2 judges that an object O is present in the extended area B, in the case where an object O measured by the second sensor 12-2 is identified in the extended area B. The second signal-output unit 16-2 outputs a second object-sensing signal S2 as a consequence of measurement of the monitored area A performed by the second sensor 12-2, when the first judging unit 14-1 judges that an object O is present in the monitored area A and in the case where the second judging unit 14-2 judges that an object O is present in the extended area B. In other words, the second signal-output unit 16-2 outputs the second object-sensing signal S2 representing the presence of the object O in the monitored area A, provided that the judgement result of the first judging unit 14-1 such that the object is present in the monitored area A has been obtained, and in accordance with the judgement result of the second judging unit 14-2 such that an object is present in the extended area B.

For example, the second judging unit 14-2 judges that an object O is present in the extended area B, in the case where there is an object O, the whole of which is identified in the extended area B, and also in the case where there is an object O, a part of which is identified in the extended area B. On the other hand, in the case where there is only an object O, the whole of which is identified outside the extended area B, the second judging unit 14-2 judges that an object O is not present in the extended area B. In the case where it is judged that an object O is not present in the extended area B, the second signal-output unit 16-2 does not output the second object-sensing signal S2 in a normal configuration, but in this case, the second signal-output unit 16-2 may be configured to output the second object-sensing signal S2, as will be described later.

In the object monitoring apparatus 10 having the above configuration, a monitoring operation performed by the first sensor 12-1 for monitoring the monitored area A is considered as the reference operation and the second sensor 12-2 is designed to measure the extended area B extending toward the outside of the monitored area A to the predetermined outside range d, so that even when the sensors 12-1, 12-2 involve the aforementioned errors, difference in performance, etc., it is possible to absorb the discrepancy, which may occur between the measurement data or processing results of sensors in the conventional configuration, by a margin monitoring operation of the second sensor 12-2 performed while ensuring a margin or flexibility corresponding to the predetermined outside range d. Therefore, according to the object monitoring apparatus 10, it is possible to resolve incongruity, due to errors, difference in performance, etc., between the monitoring operations performed by the first and second sensors 12-1, 12-2 for monitoring the monitored area A, and thus to ensure the reliability and safety of the monitoring operations.

Further, in the configuration wherein the apparatus is provided with an additional function in which the second signal-output unit 16-2 outputs the second object-sensing signal S2, when the second judging unit 14-2 judges that an object O is present in the monitored area A, and the first signal-output unit 16-1 outputs the first object-sensing signal S1, when the second judging unit 14-2 judges that an object O is present in the monitored area A and in the case where the first judging unit 14-1 judges that an object O is present in the extended area B, it is possible to consider a monitoring operation performed by one of the first sensor 12-1 and the second sensor 12-2 as the reference operation, and to perform the aforementioned margin monitoring operation by using the other of the first sensor 12-1 and the second sensor 12-2. Accordingly, it is possible to resolve incongruity, due to errors, difference in performance, etc., between the monitoring operations performed by the first and second sensors 12-1, 12-2 for monitoring the monitored area A, and thus to ensure the reliability and safety of the monitoring operations.

As previously described, it may be considered that incongruity in the monitoring operations for monitoring the monitored area A is caused due to factors in connection with the first and second sensors 12-1 and 12-2, such as a difference in specification, errors in measurement accuracy or measurement resolution, errors in an installation position or installation posture in an environment, a difference in acquisition timing or processing speed of measurement data, a difference in environmental condition (temperature or vibration) of respective installation sites, etc. Among these factors, for example, errors in measurement accuracy, which should be assumed in the system, may be increased as the distance from the sensors 12-1, 12-2 to the monitored area A increases (i.e., the error amount may vary depending on the positional relationships between the monitored area A and the sensors 12-1, 12-2). Also, the measurement accuracy may be affected by the temperature of environment surrounding the sensors 12-1, 12-2. The positional relationship between the monitored area A and the sensors 12-1, 12-2 is determined after the object monitoring apparatus 10 is installed in an environment, and the environmental temperature of the sensors 12-1, 12-2 can vary during execution of the monitoring operation. Therefore, in the object monitoring apparatus 10, an "extending distance function" having parameters, such as information concerning the positional relationship between the monitored area A and the sensors 12-1, 12-2, information concerning the environmental temperature of the sensors 12-1, 12-2, etc., is defined and previously set, and an extension amount (i.e., a predetermined outside range d) relative to the monitored area A is determined by using the extending distance function so as to generate the extended area B, so that it is possible to improve the effectiveness of the aforementioned margin monitoring operation executed by using the first sensor 12-1 or the second sensor 12-2 and further improve the reliability and safety of the monitoring operation for monitoring the monitored area A.

The functions and effects of the object monitoring apparatus 10, regarding the resolution of the aforementioned incongruity in the monitoring operations, will be described in further detail below with reference to FIG. 6 that depicts an exemplary monitoring operation of the object monitoring apparatus 10. The object monitoring apparatus 10 performing the illustrated monitoring operation has a configuration wherein each of a first monitoring system, that includes the first sensor 12-1, the first judging unit 14-1 and the first signal-output unit 16-1, and a second monitoring system, that includes the second sensor 12-2, the second judging unit 14-2 and the second signal-output unit 16-2, monitors the monitored area A by a reference operation and also monitors the extended area B by a margin monitoring operation as needed.

Figure 6:
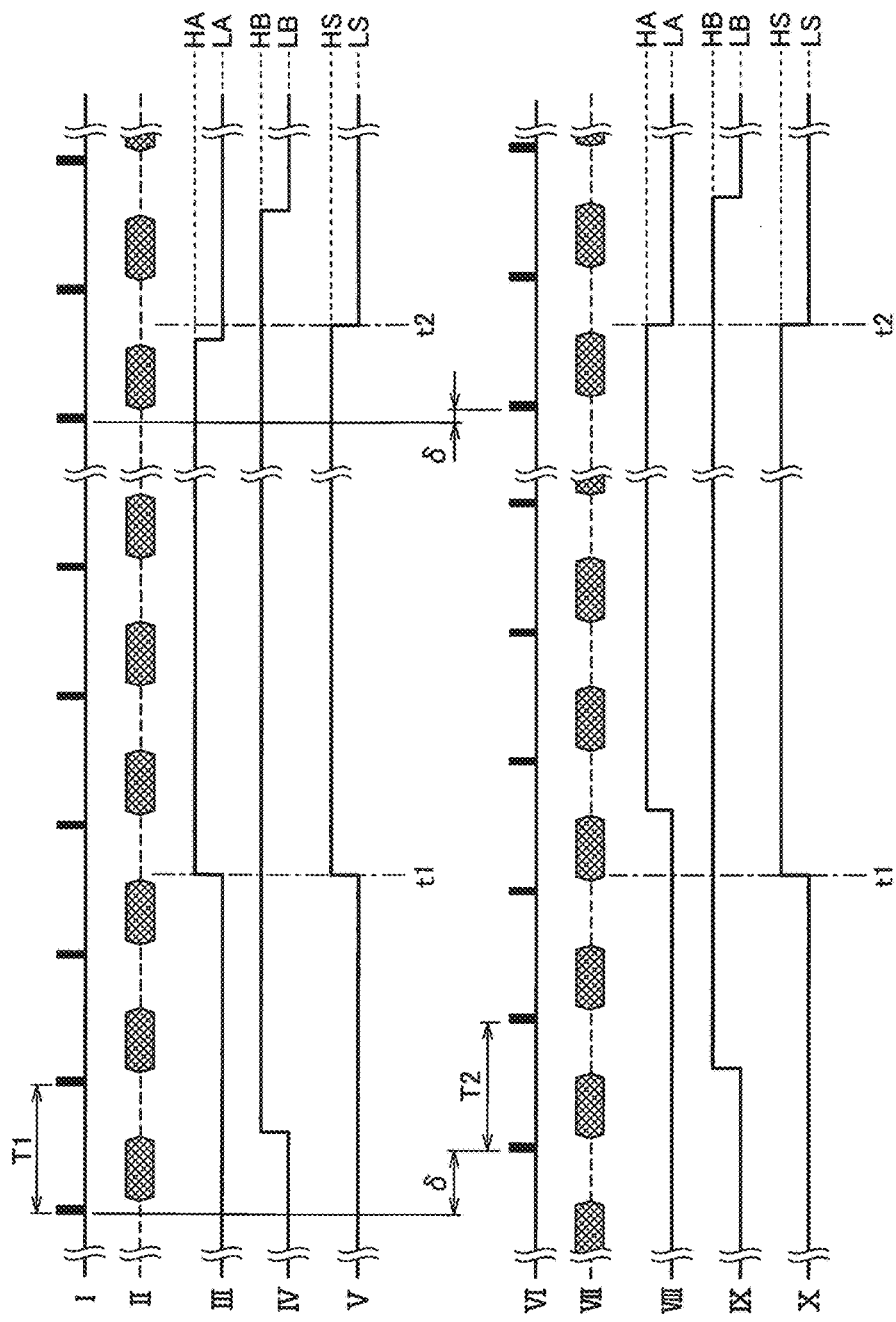
FIG. 6 is a chart illustrating one exemplary monitoring operation of the object monitoring apparatus.

Referring to FIG. 6, fire lines I to V on the upper side depict a monitoring operation using the first sensor 12-1 by a left-to-right time-series representation, and five lines VI to X on the lower side depict a monitoring operation using the second sensor 12-2 by a left-to-right time-series representation. The lines I and VI represent the measurement motions of the first and second sensors 12-1 and 12-2, respectively. The lines II and VII represent the judgement processing motions of the first and second judging units 14-1 and 14-2, respectively. The lines III and VIII represent the results of judgement executed by the first and second judging units 14-1 and 14-2, respectively, for the monitored area A, wherein "HA" represents the presence of an object and "LA" represents the absence of an object. The lines IV and IX represent the results of judgement executed by the first and second judging units 14-1 and 14-2, respectively, for the extended area B, wherein "HB" represents the presence of an object and "LB" represents the absence of an object. The lines V and X represent the motions of the first and second object-sensing signals S1 and S2 output, from the first and second signal-output units 16-1 and 16-2, respectively, in the object monitoring apparatus 10, wherein "HS" represents the presence of an output and "LS" represents the absence of an output.

In the example illustrated in FIG. 6, each of the first and second sensors 12-1, 12-2 measures a target with a predetermined period T, in the same manner as a conventional ranging sensor. In this example, it is assumed that the first and second sensors 12-1 and 12-2 have identical specifications, but they actually execute measurement motions with periods T1 ($\approx$T) and T2 ($\approx$T), respectively, because of errors in the oscillation frequency of an oscillator for driving each sensor 12-1, 12-2 relative to a design value (I and VI). Also in the illustrated example, it is assumed that a gap $\delta$ in execution timing occurs between the measurement motions of the sensors 12-1, 12-2 (I and VI). The execution timing gap $\delta$ may gradually vary in the range of $-T/2 \leq \delta \leq T/2$. Under the above conditions, a temporal discrepancy corresponding to the execution timing gap $\delta$ is generated between the judgement processing motions of the first and second judging units 14-1, 14-2 (II and VII). The execution timing gap $\delta$ can be reduced by, for example, providing means for synchronizing the measurement motions of the sensors 12-1, 12-2, but in some cases, may slightly remain.

The example of FIG. 6 depicts a monitoring operation for monitoring an object O that travels in such a manner as to enter the extended area B from the outside, thereafter move into the monitored area A, and then exit from the monitored area A through the extended area B to the outside. Referring to FIG. 6, each of the first and second sensors 12-1, 12-2 measures an object O present in the monitored area A by the third measurement motion from the left, among the measurement motions repeated with the period T1, T2, and measures a state of the monitored area A in which no object O is present by the third measurement motion from the right. Each of the first and second judging units 14-1, 14-2 executes the judgement processing in a predetermined time on the measurement data D1, D2 of each of the first and second sensors 12-1, 12-2, and outputs a result of judgement as to whether an object is present in the monitored area A (III and VIII). Further, each of the first and second sensors 12-1, 12-2 measures an object O present in the extended area B by the leftmost measurement motion among the measurement motions repeated with the period T1, 12, and measures a state of the extended area B in which no object O present by the second measurement motion from the right. Each of the first and second judging units 14-1, 14-2 executes the judgement processing in a predetermined time on the measurement data D1, D2 of each of the first and second sensors 12-1, 12-2, and outputs a result of judgement as to whether an object is present in the extended area B (IV and IX).

In the above context, looking at a configuration corresponding to a conventional object monitoring apparatus that does not take account of an extended area B, object-sensing signals, which the first and second signal-output units 16-1 and 16-2 output based on measurement data relating only to the monitored area A, involve a temporal discrepancy therebetween, which corresponds to the execution timing gap $\delta$ between the measurement motions of the first and second sensors 12-1 and 12-2, as can be seen from the lines III and VII representing the judgement results of the first and second judging units 14-1 and 14-2. In this case, if an object O stops immediately after a time point t1 at which the first judging unit 14-1 judges that an object O is present in the monitored area A, the temporal discrepancy between the object-sensing signals may be increased. When there is a temporal discrepancy between the object-sensing signals based on the measurement data of two sensors, the reliability of the monitoring operation for monitoring the monitored area A is damaged. In addition, since it is hard to determine whether the discrepancy between the object-sensing signals is due to errors in sensors or whether the discrepancy is due to a malfunction of the object monitoring apparatus, it is difficult to adopt an appropriate measure, and consequently the situation may persist wherein the reliability of the monitoring operation for the monitored area A is damaged.

Contrary to the above, in the object monitoring apparatus 10 that takes account of the extended area B, although the second judging unit 14-2 judges that an object O is present in the monitored area A, behind the time point t1 at which the first judging unit 14-1 judges that an object O is present in the monitored area A (III and VIII), the second judging unit 14-2 has already judged, at that time point, that an object O is present in the extended area B (IX), so that the second signal-output unit 16-2 initiates outputting a second object-sensing signal S2 at a time point t1 identical to the time point t1 at which the first signal-output unit 16-1 initiates outputting a first object-sensing signal S1 (V and X). Further, although the first judging unit 14-1 judges that an object O is not present in or has exited from the monitored area A, in advance of the time point t2 at which the second judging unit 14-2 judges that an object O is not present in or has exited from the monitored area A (III and VIII), the first judging unit 14-1 has been still judging, at that time point, that the object O is present in the extended area B (IV), so that the first signal-output unit 16-1 continues to output the first object-sensing signal S1. Then, the first signal-output unit 16-1 terminates outputting the first object-sensing signal S1 at a time point t2 identical to the time point t2 at which the second signal-output unit 16-2 terminates outputting the second object-sensing signal S2 (V and X).

Thus, in the object monitoring apparatus 10, despite the fact that a temporal discrepancy (i.e., a judgement error) has occurred between the measurement motions of the first and second sensors 12-1 and 12-2 as well as between the judgement processing motions of the first and second judging units 14-1 and 14-2, the first object-sensing signal S1 and the second object-sensing signal S2 are output in synchronism with each other. In addition, the first and second object-sensing signals S1 and S2 are supported by the results of judgement of the presence or absence of an object in the extended area B. As a result, it is possible to ensure the reliability and safety of the monitoring operation for monitoring the monitored area A.

Further, as will be understood from the above example, when the predetermined outside range d corresponding to the extension amount of the extended area B is determined by using the aforementioned extending distance function (i.e., determined as a function of the judgement error that is possibly caused between the first judging unit 14-1 and the second judging unit 14-2), it is possible to improve the effectiveness of the margin monitoring operation (TV or IX) executed by using the first sensor 12-1 or the second sensor 12-2. The extending distance function may be suitably set by, for example, the designer of the object monitoring apparatus 10 in accordance with the performance or combination of the first and second sensors 12-1 and 12-2, the distance between the monitored area A and the sensors 12-1, 12-2, etc.

In the above example, each of the first judging unit 14-1 and the second judging unit 14-2 executes, by concurrent processing, the judgement of whether an object O is present in the monitored area A and the judgement of whether an object O is present in the extended area B. However, the present disclosure is not limited to the above configuration, but may be configured so that at the instant when the first judging unit 14-1 judges that an object O is present in the monitored area A, the second judging unit 14-2 starts a process for judgment as to whether or not an object O is present in the extended area B. Also, the present disclosure may be configured so that at the instant when the second judging unit 14-2 judges that an object O is present in the monitored area A, the first judging unit 14-1 starts a process for judgement as to whether or not an object O is present in the extended area B.

In the case of executing the concurrent processing, output of the second object-sensing signal S2 can be started at the time point t1 identical to the time point t1 at which output of the first object-sensing signal S1 is started, as previously described, but it is required to ensure a calculation capability sufficient to concurrently execute two processes. Contrary to this, in the configuration wherein at the instant when it is judged that an object O is present in the monitored area A, a process is started for judging whether or not an object O is present in the extended area B, a signal output may delay correspondingly to a time (e.g., several microseconds) taken to execute a process for judging the extended area B, but a relatively lower calculation capability may only be required. The selection of the processing scheme can be determined in accordance with the processing time or cost required in the object monitoring apparatus 10, the intended use of the object monitoring apparatus 10, etc.

The object monitoring apparatus 10 may include at least two, desired number of sensors. More specifically, the object monitoring apparatus 10 may include "n" sensors 12 (12-1, 12-2, . . . , 12-$n$) that measure mutually corresponding spatial areas R, "n" judging units 14 (14-1, 14-2, . . . , 14-$n$) that judge whether an object O is present in the monitored area A or the extended area B, based on measurement data D of the respective sensors 12, and "n" signal-output units 16 (16-1, 16-2, . . . , 16-$n$) that output object-sensing signals S as the results of measurement of the monitored area A executed by the respective sensors 12 in accordance with the results of judgement executed by the respective judging units 14. In this configuration, at least one of "n" sensors 12, at least one of "n" judging units 14 and at least one of "n" signal-output units 16 may correspond respectively to the aforementioned first sensor 12-1, first judging unit 14-1 and first signal-output unit 16-1, while at least another one of "n" sensors 12, at least another one of "n" judging units 14 and at least another one of "n" signal-output units 16 may correspond respectively to the aforementioned second sensor 12-2, second judging unit 14-2 and second signal-output unit 16-2. A configuration including at least three monitoring systems, each including a single sensor 12, a single judging unit 14 and a single signal-output unit 16, which are associated with or related to each other, provides effects equivalent to the aforementioned effects, and ensures additional effects such that the reliability of a monitoring operation for monitoring the monitored area A can further be improved.

Figure 7:
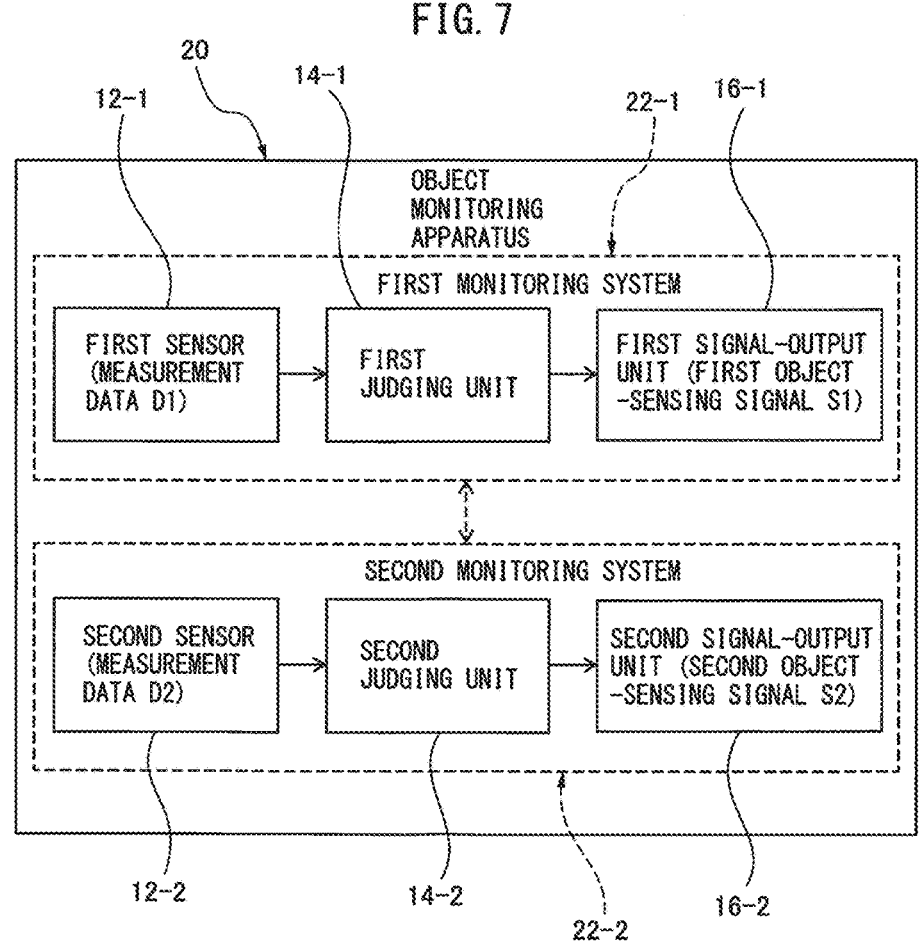
FIG. 7 is a functional block diagram illustrating a configuration of another embodiment of an object monitoring apparatus.

FIG. 7 illustrates, by functional blocks, the configuration of another embodiment of an object monitoring apparatus 20, which includes a plurality of sensors. The object monitoring apparatus 20 has a configuration analogous to that of the aforementioned object monitoring apparatus 10, except for the provision of a "monitoring system" explicitly described as an essential component, and therefore corresponding components are denoted by corresponding reference numerals and the details thereof will not be repeated.

The object monitoring apparatus 20 includes a plurality of sensors 12 (a first sensor 12-1 and a second sensor 12-2, in FIG. 7) that measure mutually corresponding spatial areas R (FIGS. 2 and 3); a plurality of judging units 14 (a first judging unit 14-1 and a second judging unit 14-2, in FIG. 7) that judge, for the respective sensors, whether an object O (FIGS. 2 and 3) is present in a common monitored area A (FIGS. 2 and 3) defined within the spatial area R, based on measurement data D (measurement data D1 and measurement data D2, in FIG. 7) of the sensors 12; and a plurality of signal-output units 16 (a first signal-output unit 16-1 and a second signal-output unit 16-2, in FIG. 7) that output, for the respective judging units, object-sensing signals S (a first object-sensing signal S1 and a second object-sensing signal S2, in FIG. 7) as results of measurement of the monitored area A executed by the respective sensors 12 associated with the respective judging units 14, when the respective judging units 14 judge that an object O is present in the monitored area A. The object monitoring apparatus 20 further includes a plurality of monitoring systems 22 (a first monitoring system 22-1 and a second monitoring system 22-2, in FIG. 7) each including a single sensor 12, a single judging unit 14 and a single signal-output unit 16, which are associated with or related to each other. In each of the monitoring systems 22 (e.g., the monitoring system 22-2), the judging unit 14 (e.g., the second judging unit 14-2) judges whether an object O is present in an extended area B (FIGS. 2 and 3) extending toward the outside of the monitored area A to a predetermined outside range "d" (FIGS. 2 and 3), based on the measurement data D (e.g., the measurement data D2), and the signal-output unit 16 (e.g., the second signal-output unit 16-2) outputs an object-sensing signal S (e.g., the second object-sensing signal S2), when the judging unit 14 (e.g., the first judging unit 14-1) in another monitoring system 22 (e.g., the monitoring system 22-1) judges that an object O is present in the monitored area A and in the case where its own judging unit 14 (e.g., the second judging unit 14-2) judges that an object O is present in the extended area B.

In the object monitoring apparatus 20, the predetermined outside range d corresponding to the extension amount of the extended area B may be determined by using the aforementioned extending distance function defined between the plurality of judging units 14. Further, in the object monitoring apparatus 20, each of the judging units 14 may judge whether an object O is present in the monitored area A and, concurrently therewith, judge whether an object O is present in the extended area B. Alternatively, the object monitoring apparatus 20 may be configured so that at the instant when at least one judging unit 14 judges that an object O is present in the monitored area A, another judging unit 14 starts a process for judgement as to whether or not an object O is present in the extended area B. Each of the monitoring systems 22 may be implemented as software for making a processor, such as a CPU (Central Processing Unit) of a computer, function. Alternatively, each of the monitoring systems 22 may be implemented as hardware, such as a processor capable of executing some or all processes of the software.

The object monitoring apparatus 20 having the above configuration provides effects equivalent to those of the aforementioned object monitoring apparatus 10. More specifically, in the object monitoring apparatus 20, the common monitored area A is redundantly monitored by using the plurality of sensors 12, and thereby the reliability and safety of a monitoring operation for monitoring the monitored area A is improved. Further, in the object monitoring apparatus 20, a monitoring operation performed in at least one monitoring system 22 for monitoring the monitored area A is considered as a reference operation and another monitoring system 22 is designed to monitor the extended area B extending toward the outside of the monitored area A to the predetermined outside range d, so that even when the plurality of sensors 12 involve the aforementioned errors, difference in performance, etc., it is possible to absorb the discrepancy of the monitoring operations, which may occur between the monitoring systems in the conventional configuration, by a margin monitoring operation in the other monitoring system 22 performed while ensuring a margin or flexibility corresponding to the predetermined outside range d. Therefore, according to the object monitoring apparatus 20, it is possible to resolve incongruity between the monitoring operations performed in the plurality of monitoring systems for monitoring the monitored area A, and thus to ensure the reliability and safety of the monitoring operations. Moreover, in the object monitoring apparatus 20, the predetermined outside range d can be previously set by using an extending distance function, so that it is possible to improve the effectiveness of the margin monitoring operation in the monitoring system 22 and further improve the reliability and safety of the monitoring operation for monitoring the monitored area A.

Figure 8:
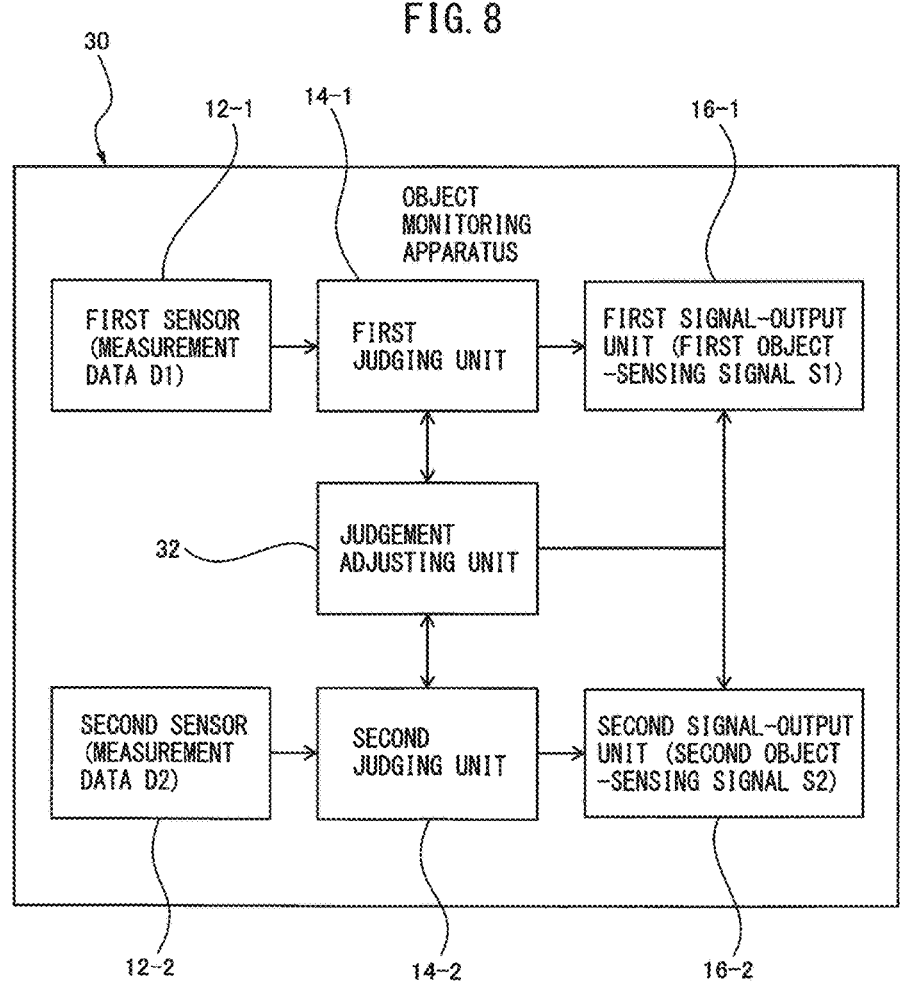
FIG. 8 is a functional block diagram illustrating a configuration of a further embodiment of an object monitoring apparatus.

FIG. 8 illustrates, by functional blocks, the configuration of a further embodiment of an object monitoring apparatus 30, which includes a plurality of sensors. The object monitoring apparatus 30 has a configuration analogous to that of the aforementioned object monitoring apparatus 10, except for the provision of a "judgement adjusting unit" as an essential component, and therefore corresponding components are denoted by corresponding reference numerals and the details thereof will not be repeated.

The object monitoring apparatus 30 includes a plurality of sensors 12 (a first sensor 12-1 and a second sensor 12-2, in FIG. 8) that measure mutually corresponding spatial areas R (FIGS. 2 and 3); one judging unit 14 (a first judging unit 14-1, in FIG. 8) that judges whether an object O (FIGS. 2 and 3) is present in a common monitored area A (FIGS. 2 and 3) defined within the spatial area R and whether an object O is present in an extended area B extending toward the outside of the monitored area A to a predetermined outside range "d", based on measurement, data D (e.g., measurement data D1) of one sensor 12 (e.g., the first sensor 12-1); another judging unit 14 (a second judging unit 14-2, in FIG. 8) that judges whether an object O is present in the monitored area A and whether an object O is present in the extended area B, based on measurement data D (e.g., measurement data D2) of another sensor 12 (e.g., the second sensor 12-2); one signal-output unit 16 (a first signal-output unit 16-1, in FIG. 8) that outputs an object-sensing signal S (a first object-sensing signal S1) as a result of judgement of the monitored area A executed by one judging unit 14 (e.g., the first judging unit 14-1), when the said judging unit 14 judges that an object O is present in the monitored area A; and another signal-output unit 16 (a second signal-output unit 16-2, in FIG. 8) that outputs an object-sensing signal S (a second object-sensing signal S2) as a result of judgement of the monitored area A executed by another judging unit 14 (e.g., the second judging unit 14-2), when the said judging unit 14 judges that an object O is present in the monitored area A.

The object monitoring apparatus 30 further includes a judgement adjusting unit 32 that is configured to, when one of the judging units 14 judges that an object O is present in the monitored area A and in the case where another judging unit 14 judges that an object O is present in the extended area B, make the signal-output unit 16 associated with the said other judging unit 14 output the object-sensing signal S. For example, the judgement adjusting unit 32 makes the second signal-output unit 16-2 output the second object-sensing signal S2, when the first judging unit 14-1 judges that an object O is present in the monitored area A and in the case where the second judging unit 14-2 judges that an object O is present in the extended area B, and also makes the first signal-output unit 16-1 output the first object-sensing signal S1, when the second judging unit 14-2 judges that an object O is present in the monitored area A and in the case where the first judging unit 14-1 judges that an object O is present in the extended area B.

In the object monitoring apparatus 30, the predetermined outside range d corresponding to the extension amount of the extended area B may be determined by using the aforementioned extending distance function defined between the plurality of judging units 14. Further, in the object monitoring apparatus 30, each of the judging units 14 may judge whether an object O is present in the monitored area A and, concurrently therewith, judge whether an object O is present in the extended area B. Alternatively, the object monitoring apparatus 30 may be configured so that at the instant when at least one judging unit 14 judges that an object O is present in the monitored area A, another judging unit 14 starts a process for judgement as to whether or not an object O is present in the extended area B. The judgement adjusting unit 32 may be implemented as software for making a processor, such as a CPU (Central Processing Unit) of a computer, function. Alternatively, the judgement adjusting unit 32 may be implemented as hardware, such as a processor capable of executing some or all processes of the software. The function of the judgement adjusting unit 32 may also be provided to at least one judging unit 14 or at least one signal-output unit 16.

The object monitoring apparatus 30 having the above configuration provides effects equivalent to those of the aforementioned object monitoring apparatus 10. More specifically, in the object monitoring apparatus 30, the common monitored area A is redundantly monitored by using the plurality of sensors 12, and thereby the reliability and safety of a monitoring operation for monitoring the monitored area A is improved. Further, in the object monitoring apparatus 30, a monitoring operation performed by at least one sensor 12 for monitoring the monitored area A is considered as a reference operation and another sensor 12 is designed to measure the extended area B extending toward the outside of the monitored area A to the predetermined outside range d, so that even when the plurality of sensors 12 involve the aforementioned errors, difference in performance, etc., it is possible to absorb the discrepancy, which may occur between the measurement data or processing results of sensors in the conventional configuration, by a margin monitoring operation of the other sensor 12 performed while ensuring a margin or flexibility corresponding to the predetermined outside range d. Therefore, according to the object monitoring apparatus 30, it is possible to resolve incongruity between the monitoring operations performed by the plurality of sensors 12 for monitoring the monitored area A, and thus to ensure the reliability and safety of the monitoring operations. Moreover, in the object monitoring apparatus 30, the predetermined outside range d can be previously set by using an extending distance function, so that it is possible to improve the effectiveness of the margin monitoring operation executed by using the sensor 12 and further improve the reliability and safety of the monitoring operation for monitoring the monitored area A.

In each of the object monitoring apparatuses 10, 20 and 30, in a case where, for example, the first signal-output unit 16-1 outputs a first object-sensing signal S1 while the second signal-output unit 16-2 does not output a second object-sensing signal S2, a user can determine that the case is not resulted from errors or difference in performance between sensors but is caused by the malfunction of the object monitoring apparatus 10, 20, 30, in the light of a characteristic configuration of the second signal-output unit 16-2 (i.e., a configuration such as to output a second object-sensing signal S2 when the first judging unit 14-1 judges that an object O is present in the monitored area A and in the case where the second judging unit 14-2 judges that an object O is present in the extended area B). This is a remarkable effect obtained by appropriately setting the extension amount of the extended area B (i.e., the predetermined outside range d) in such a manner as to correspond to an error that is possibly caused between the results of judgement executed by the plurality of judging units 14 due to the aforementioned errors, difference in performance, etc., involved in the plurality of sensors 12. As to whether recovery work, etc., is performed when the user determines the malfunction, a variety of criteria may be defined in accordance with, for example, the intended use of the object monitoring apparatus 10, 20, 30. For example, in a situation in which a large number of signal-output units 16 output object-sensing signals S while only one signal-output unit 16 other than the former signal-output units 16 does not output an object-sensing signal S, it is possible to determine how the recovery work, etc., should be performed after the user determines the malfunction of the object monitoring apparatus 10, 20, 30, in accordance with, for example, the intended use of the object monitoring apparatus 10, 20, 30.

The object monitoring apparatus 10, 20, 30 may be provided with various additional functions. The configurations of further embodiments of the object monitoring apparatus, configured by adding various functions to the configuration of the object monitoring apparatus 10, will be described below with reference to FIGS. 9 to 14. Each of the object monitoring apparatuses illustrated in FIGS. 9 to 14 has a configuration analogous to that of the above-mentioned object monitoring apparatus 10, except for the provision of an additional function (or an additional component), and therefore corresponding components are denoted by corresponding reference numerals and the details thereof will not be repeated. Note that the following various additional functions are analogously applicable to the object monitoring apparatus 20 or 30.

Figure 9:
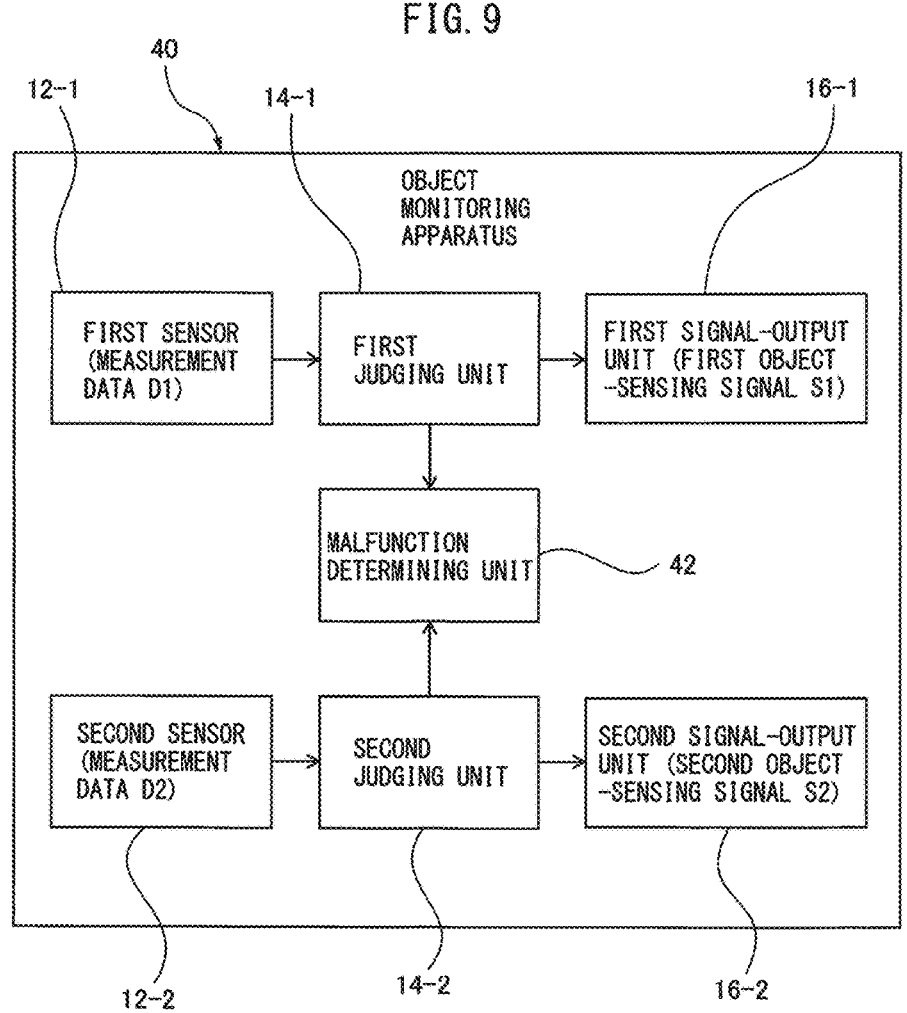
FIG. 9 is a functional block diagram illustrating a configuration of a further embodiment of an object monitoring apparatus.

An object monitoring apparatus 40 illustrated in FIG. 9 further includes, in addition to the components of the aforementioned object monitoring apparatus 10, a malfunction determining unit 42 that determines a malfunction of the object monitoring apparatus 40, when one of the plurality of judging units 14 judges that an object O is present in the monitored area A and in the case where another judging unit 14 judges that an object O is not present in the extended area B. For example, the malfunction determining unit 42 can determine a malfunction of the object monitoring apparatus 40, when the first judging unit 14-1 judges that an object O is present in the monitored area A and in the case where the second judging unit 14-2 judges that an object O is not present in the extended area B. Alternatively, the malfunction determining unit 42 can determine a malfunction of the object monitoring apparatus 40, when the second judging unit 14-2 judges that an object O is present in the monitored area A and in the case where the first judging unit 14-1 judges that an object O is not present in the extended area B.

The malfunction determining unit 42 may be implemented as software for making a processor, such as a CPU (Central Processing Unit) of a computer, function. Alternatively, the malfunction determining unit 42 may be implemented as hardware, such as a processor capable of executing some or all processes of the software. The malfunction determining unit 42 continuously or intermittently refers to the results of judgement executed by the plurality of judging units 14, and executes the determination of whether or not the object monitoring apparatus 40 malfunctions.

The object monitoring apparatus 40 provides an effect such that the determination of whether the object monitoring apparatus 40 malfunctions is automatically executed by the object monitoring apparatus 40, in addition to the effects of the aforementioned object monitoring apparatus 10.

Figure 10:
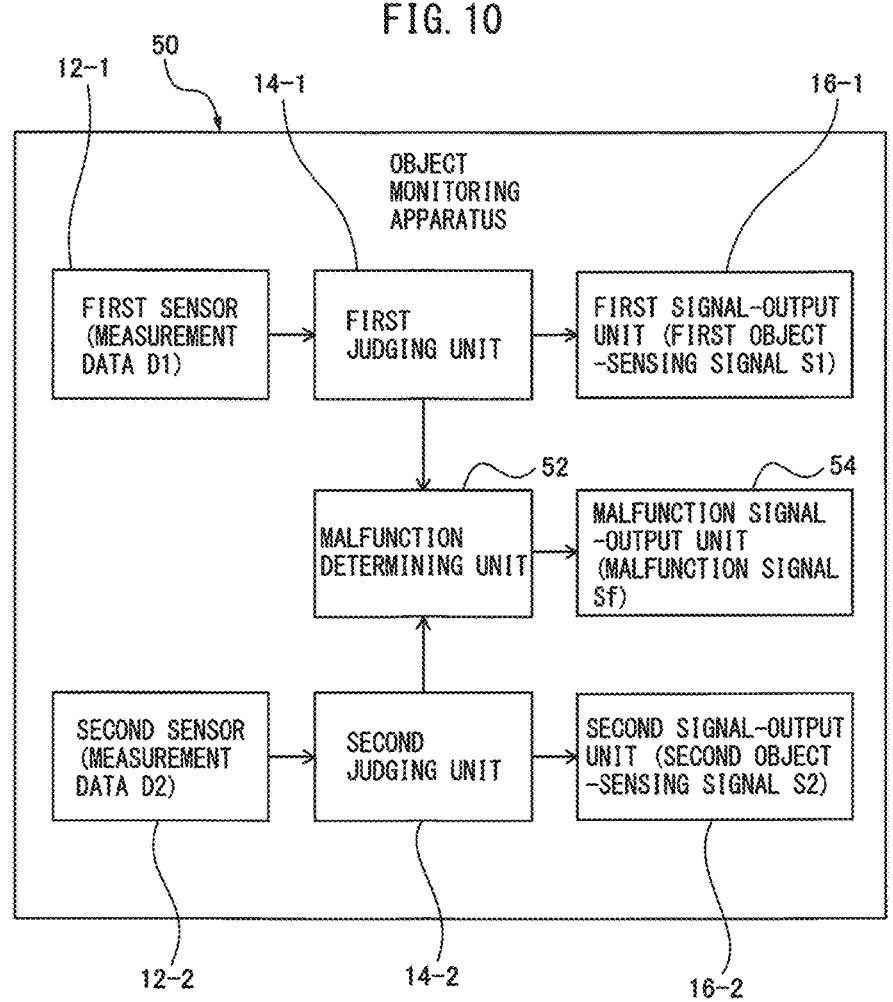
FIG. 10 is a functional block diagram illustrating a configuration of a further embodiment of an object monitoring apparatus.

An object monitoring apparatus 50 illustrated in FIG. 10 further includes, in addition to the components of the aforementioned object monitoring apparatus 10, a malfunction determining unit 52 (corresponding to the malfunction determining unit 42 illustrated in FIG. 9) that determines a malfunction of the object monitoring apparatus 50, when one of the plurality of judging units 14 judges that an object O is present in the monitored area A and in the case where another judging unit 14 judges that an object O is not present in the extended area B; and a malfunction signal output unit 54 that outputs a malfunction signal Sf for informing the malfunction, when the malfunction determining unit 52 determines the malfunction of the object monitoring apparatus 50.

Each of the malfunction determining unit 52 and the malfunction signal output unit 54 may be implemented as software for making a processor, such as a CPU (Central Processing Unit) of a computer, function. Alternatively, each of the malfunction determining unit 52 and the malfunction signal output unit 54 may be implemented as hardware, such as a processor capable of executing some or all processes of the software. The malfunction determining unit 52 continuously or intermittently refers to the results of judgement executed by the plurality of judging units 14, and executes the determination of whether or not the object monitoring apparatus 50 malfunctions. The malfunction signal output unit 54 continuously or intermittently refers to the result of determination executed by the malfunction determining unit 52, and when the result of determination indicates the malfunction, outputs the malfunction signal Sf to an external device.

The object monitoring apparatus 50 provides effects such that the determination of whether the object monitoring apparatus 50 malfunctions is automatically executed by the object monitoring apparatus 50, and when the object monitoring apparatus 50 automatically determines its malfunction, the user is informed, for example, of the fact that a malfunction has occurred by the malfunction signal Sf, in addition to the effects of the aforementioned object monitoring apparatus 10.

Figure 11:
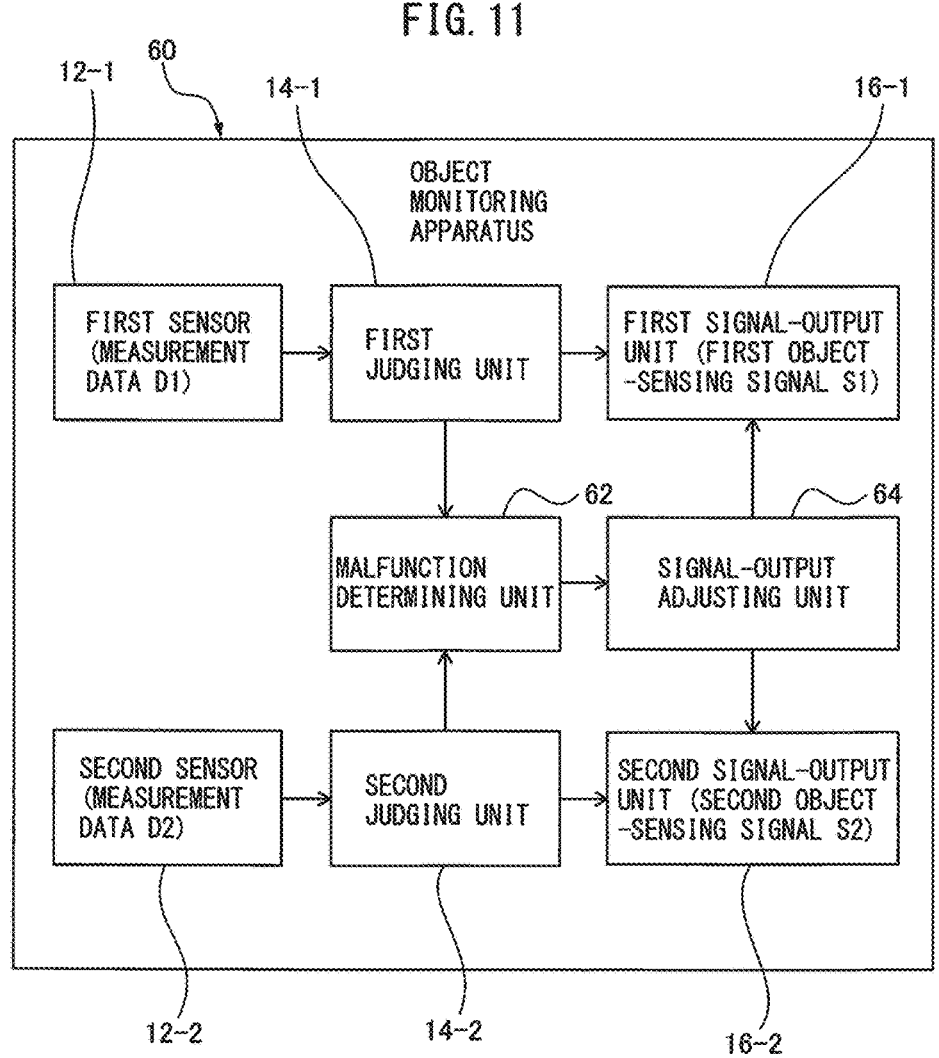
FIG. 11 is a functional block diagram illustrating a configuration of a further embodiment of an object monitoring apparatus.

An object monitoring apparatus 60 illustrated in FIG. 11 further includes, in addition to the components of the aforementioned object monitoring apparatus 10, a malfunction determining unit 62 (corresponding to the malfunction determining unit 42 illustrated in FIG. 9) that determines a malfunction of the object monitoring apparatus 60, when one of the plurality of judging units 14 judges that an object O is present in the monitored area A and in the case where another judging unit 14 judges that an object O is not present in the extended area B; and a signal-output adjusting unit 64 that makes the signal-output unit 16, associated with or related to the judging unit 14 judging that an object O is not present in the extended area B, output an object-sensing signal S, when the malfunction determining unit 62 determines the malfunction of the object monitoring apparatus 60. For example, the signal-output adjusting unit 64 can make the second signal-output unit 16-2 output a second object-sensing signal S2, the second signal-output unit 16-2 related to the second judging unit 14-2 judging that an object O is not present in the extended area B, or make the first signal-output unit 16-1 output a first object-sensing signal S1, the first signal-output unit 16-1 related to the first judging unit 14-1 judging that an object O is not present in the extended area B, when the malfunction determining unit 62 determines the malfunction.

Each of the malfunction determining unit 62 and the signal-output adjusting unit 64 may be implemented as software for making a processor, such as a CPU (Central Processing Unit) of a computer, function. Alternatively, each of the malfunction determining unit 62 and the signal-output adjusting unit 64 may be implemented as hardware, such as a processor capable of executing some or all processes of the software. The malfunction determining unit 62 continuously or intermittently refers to the results of judgement executed by the plurality of judging units 14, and executes the determination of whether or not the object monitoring apparatus 60 malfunctions. The signal-output adjusting unit 64 continuously or intermittently refers to the result of determination executed by the malfunction determining unit 62, and when the result of determination indicates the malfunction, makes the signal-output unit 16 output the object-sensing signal S, the signal-output unit 16 related to the judging unit 14 having judged that an object O is not present in the extended area B.

The object monitoring apparatus 60 provides effects such that the determination of whether the object monitoring apparatus 60 malfunctions is automatically executed by the object monitoring apparatus 60, and when the object monitoring apparatus 60 automatically determines its malfunction, the signal-output unit 16 associated with the judging unit 14 having judged that an object O is not present in the extended area B outputs the object-sensing signal S, similarly to the signal-output unit 16 associated with the judging unit 14 having judged that an object O is present in the monitored area A, so that a countermeasure to be adopted when an object O is present in the monitored area A can be quickly taken even when the apparatus malfunctions, in addition to the effects of the aforementioned object monitoring apparatus 10. Note that a component corresponding to the signal-output adjusting unit 64 may also be added to the object, monitoring apparatus 50 illustrated in FIG. 10.

Figure 12:
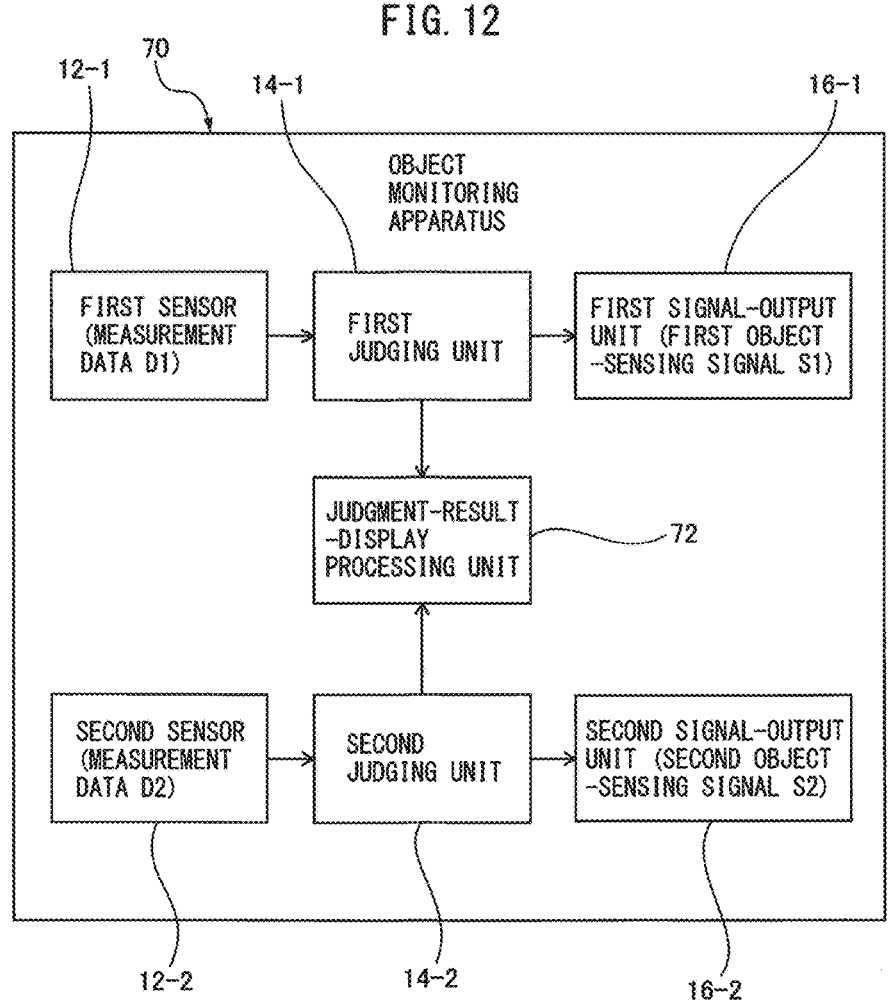
FIG. 12 is a functional block diagram illustrating a configuration of a further embodiment of an object monitoring apparatus.

An object monitoring apparatus 70 illustrated in FIG. 12 further includes, in addition to the components of the aforementioned object monitoring apparatus 10, a judgment-result-display processing unit 72 that executes a process for displaying a result of judgement executed by each of the plurality of judging unit 14.

The judgment-result-display processing unit 72 may be implemented as software for making a processor, such as a CPU (Central Processing Unit) of a computer, function. Alternatively, the judgment-result-display processing unit 72 may be implemented as hardware, such as a processor capable of executing some or all processes of the software. The judgment-result-display processing unit 72 continuously or intermittently refers to the results of judgement executed by the plurality of judging units 14, and executes a process for displaying the judgement results by, for example, flashing light or an image.

The object monitoring apparatus 70 provides effects such that information as to whether or not each judging unit 14 has judged that an object O is present in the monitored area A or the extended area B, can be displayed on an external display device by, for example, flashing light or an image, in addition to the effects of the aforementioned object monitoring apparatus 10. Note that a component corresponding to the judgment-result-display processing unit 72 may also be added to each of the object monitoring apparatuses 40, 50 and 60 illustrated in FIGS. 9 to 11.

Figure 13:
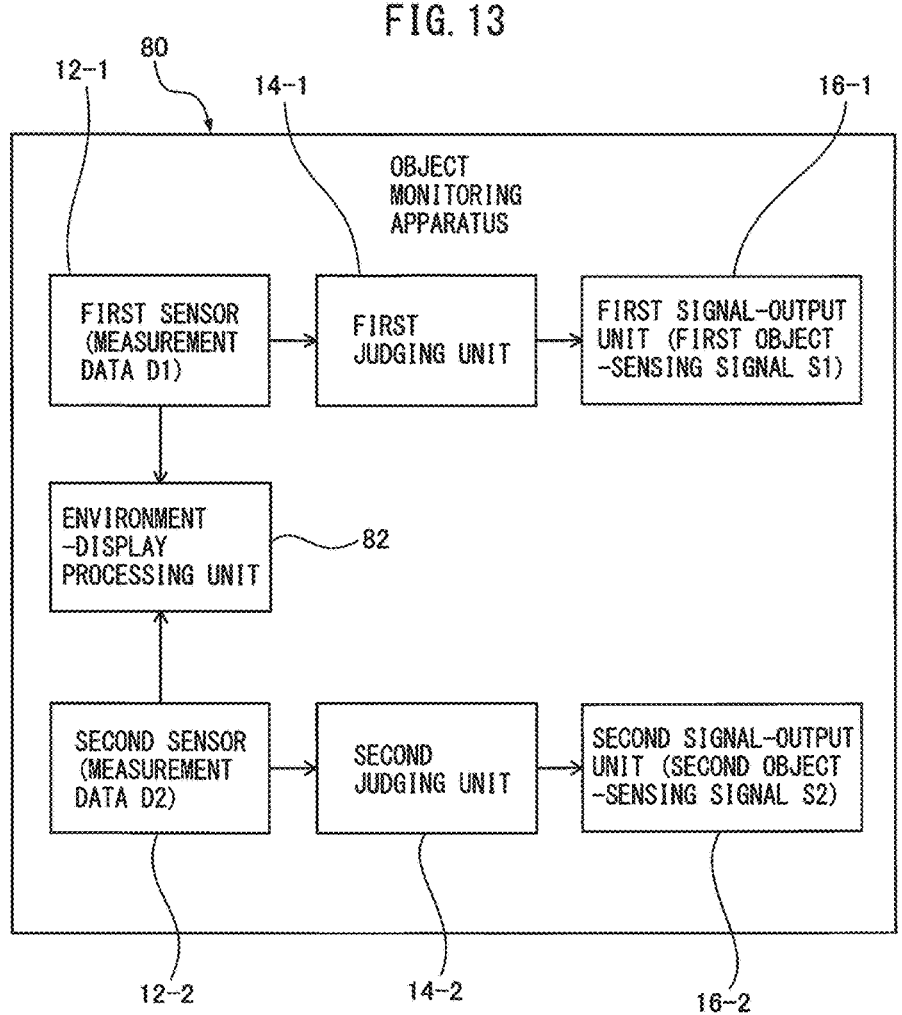
FIG. 13 is a functional block diagram illustrating a configuration of a further embodiment of an object monitoring apparatus.
Figure 14:
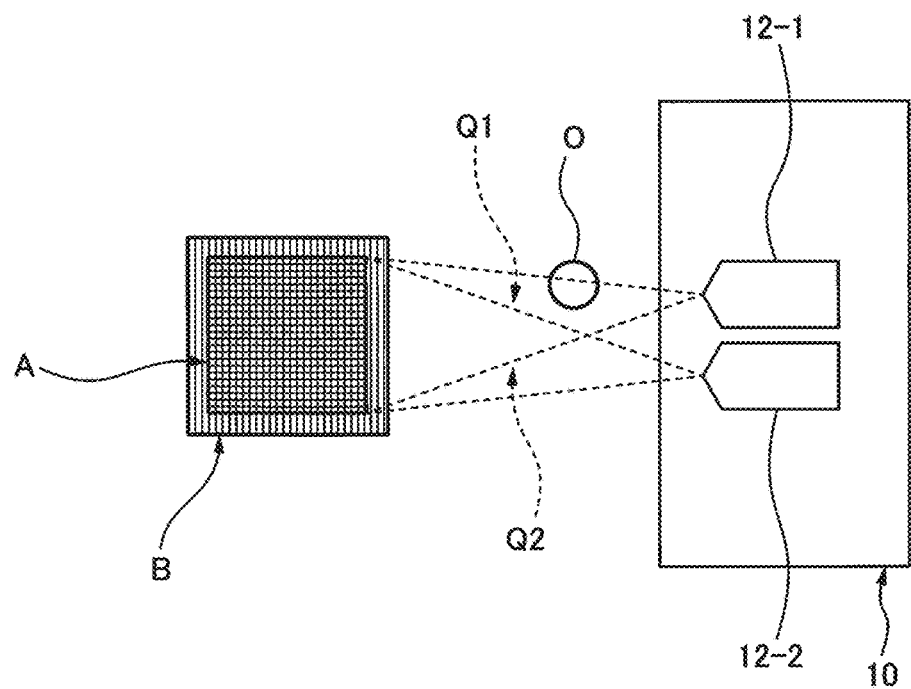
FIG. 14 is a diagram schematically illustrating a configuration of a further embodiment of an object monitoring apparatus.

An object monitoring apparatus 80 illustrated in FIG. 13 further includes, in addition to the components of the aforementioned object monitoring apparatus 10, an environment-display processing unit 82 that executes a process for displaying an object O measured by each of the plurality of sensors 12 together with the monitored area A and the extended area B.

The environment-display processing unit 82 may be implemented as software for making a processor, such as a CPU (Central Processing Unit) of a computer, function. Alternatively, the environment-display processing unit 82 may be implemented as hardware, such as a processor capable of executing some or all processes of the software. The environment-display processing unit 82 continuously or intermittently refers to the measurement data D of the plurality of sensors 12, and executes a process for displaying, as an image, the object O together with separately obtained data of the monitored area A and the extended area B.

The object monitoring apparatus 80 provides effects such that the positional relationship between the object O and the monitored and extended areas A and B in the spatial area R can be displayed as a two- or three-dimensional image, in addition to the effects of the aforementioned object monitoring apparatus 10. Note that a component corresponding to the environment-display processing unit 82 may also be added to each of the object monitoring apparatuses 40, 50, 60 and 70 illustrated in FIGS. 9 to 12.

Each of the aforementioned object monitoring apparatuses 10, 20, 30, 40, 50, 60, 70 and 80 may further include the function of monitoring an object O present in a space between each sensor 12 and the monitored area A. In this configuration, as illustrated in, e.g., FIG. 14, the first judging unit 14-1 (FIG. 1) further judges whether an object O is present in a first space Q1 defined from the first sensor 12-1 to the monitored area A; the first signal-output unit 16-1 (FIG. 1) further outputs the first object-sensing signal S1 (FIG. 1), when the first judging unit 14-1 judges that an object O is present in the first space Q1; the second judging unit 14-2 (FIG. 1) further judges whether an object O is present in a second space Q2 defined from the second sensor 12-2 to the monitored area A; and the second signal-output unit 16-2 (FIG. 1) further outputs the second object-sensing signal S2 (FIG. 1), when the second judging unit 14-2 judges that an object O is present in the second space Q2.

In the environment of usage of the object monitoring apparatus 10, 20, 30, 40, 50, 60, 70, 80, if an object O is present in a space (the first space Q1, the second space Q2) between the monitored area A and each sensor 12, a situation may arise in which the judging unit 14 is incapable of judging whether an object O is present in a part of the monitored area A, which is hidden by the object O in the space. In order to address this situation, in the aforementioned configuration wherein the signal-output unit 16 outputs the object-sensing signal S when the judging unit 14 judges that an object O is present in the space (the first space Q1, the second space Q2), it is possible to deal with the situation wherein the sensor 12 cannot measure the hidden part of the monitored area A as if an object O is present in the hidden part. Consequently, the object monitoring apparatus 10, 20, 30, 40, 50, 60, 70, 80 can always operate on the safe side, when the apparatus is applied, for example, to monitor a dangerous off-limits area as the monitored area.

While the embodiments of the disclosure have been described, it will be understood, by those skilled in the art, that various changes or modifications may be made thereto without departing from the scope of the following claims.

The invention claimed is:

1. An object monitoring apparatus, comprising:
a first sensor that measures a spatial area and a second sensor that measures a spatial area corresponding to the spatial area measured by the first sensor;
a first judging unit that judges whether an object is present in a monitored area defined within the spatial area, based on measurement data of the first sensor;
a second judging unit that judges whether an object is present in an extended area extending toward an outside of the monitored area to a predetermined outside range, based on measurement data of the second sensor;
a first signal-output unit that outputs a first object-sensing signal as a result of judgement of the monitored area based on the measurement data of the first sensor, when the first judging unit judges that an object is present in the monitored area; and
a second signal-output, unit that outputs a second object-sensing signal as a result of judgement of the monitored area based on the measurement data of the second sensor, when the first judging unit judges that an object is present in the monitored area and in a case where the second judging unit judges that an object is present in the extended area.

2. The object monitoring apparatus of claim 1, wherein the second judging unit judges whether an object is present in the monitored area, based on measurement data of the second sensor;
the first judging unit judges whether an object is present in the extended area, based on measurement data of the first sensor;
the second signal-output unit outputs the second object-sensing signal, when the second judging unit judges that an object is present in the monitored area; and
the first signal-output unit outputs the first object-sensing signal, when the second judging unit judges that an object is present in the monitored area and in a case where the first judging unit judges that an object is present in the extended area.

3. An object monitoring apparatus, comprising:
a first sensor that measures a spatial area and a second sensor that measures a spatial area corresponding to the spatial area measured by the first sensor;
a first judging unit that judges whether an object is present in a monitored area defined within the spatial area and whether an object is present in an extended area extending toward an outside of the monitored area to a predetermined outside range, based on measurement data of the first sensor;
a second judging unit that judges whether an object is present in the monitored area and whether an object is present in the extended area, based on measurement data of the second sensor;
a first signal-output unit that outputs a first object-sensing signal as a result of judgement of the monitored area executed by the first judging unit, when the first judging unit judges that an object is present in the monitored area;
a second signal-output unit that outputs a second object-sensing signal as a result of judgement of the monitored area executed by the second judging unit, when the second judging unit judges that an object is present in the monitored area; and
a judgement adjusting unit that makes the second signal-output unit output the second object-sensing signal, when the first judging unit judges that an object is present in the monitored area and in a case where the second judging unit judges that an object is present in the extended area, and makes the first signal-output unit output the first object-sensing signal, when the second judging unit judges that an object is present in the monitored area and in a case where the first judging unit judges that an object is present in the extended area.

4. The object monitoring apparatus of claim 2, further comprising a malfunction determining unit that determines a malfunction of the object monitoring apparatus, when the first judging unit judges that an object is present in the monitored area and in a case where the second judging unit judges that an object is not present in the extended area, or when the second judging unit judges that an object is present in the monitored area and in a case where the first judging unit judges that an object is not present in the extended area.

5. The object monitoring apparatus of claim 4, further comprising a malfunction signal output unit that outputs a malfunction signal for informing the malfunction, when the malfunction determining unit determines the malfunction.

6. The object monitoring apparatus of claim 4, further comprising a signal-output adjusting unit that makes the second signal-output unit output the second object-sensing signal, the second signal-output unit related to the second judging unit judging that an object is not present in the extended area, or makes the first signal-output unit output the first object-sensing signal, the first signal-output unit related to the first judging unit judging that an object is not present in the extended area, when the malfunction determining unit determines the malfunction.

7. The object monitoring apparatus of claim 2, wherein each of the first judging unit and the second judging unit judges whether an object is present in the monitored area and concurrently therewith whether an object is present in the extended area.

8. The object monitoring apparatus of claim 2, wherein, at an instant when one of the first judging unit and the second judging unit judges that an object is present in the monitored area, the other of the first judging unit and the second judging unit starts judgement as to whether an object is present in the extended area.

9. The object monitoring apparatus of claim 2, wherein the first judging unit or the second judging unit determines a distance between the monitored area and an object present outside the monitored area, based on the measurement data, and judges that the object is present in the extended area when the distance is equal to or less than the predetermined outside range.

10. The object monitoring apparatus of claim 1, further comprising a judgment-result-display processing unit that executes a process for displaying a judgment result by each of the first judging unit and the second judging unit.

11. The object monitoring apparatus of claim 1, further comprising an environment-display processing unit that executes a process for displaying an object measured by each of the first sensor and the second sensor together with the monitored area and the extended area.

12. The object monitoring apparatus of claim 1, wherein the predetermined outside range is a function of a judgment error that is possibly caused between the first judging unit and the second judging unit.

13. The object monitoring apparatus of claim 1, wherein the first sensor and the second sensor are disposed so as to face in a mutually identical direction.

14. The object monitoring apparatus of claim 1, comprising a first monitoring system that includes the first sensor, the first judging unit and the first signal-output unit, and a second monitoring system that includes the second sensor, the second judging unit and the second signal-output unit.

15. The object monitoring apparatus of claim 11, wherein the first judging unit further judges whether an object is present in a first space defined from the first sensor to the monitored area;
   the first signal-output unit further outputs the first object-sensing signal when the first judging unit judges that an object is present in the first space;
   the second judging unit further judges whether an object is present in a second space defined from the second sensor to the monitored area; and
   the second signal-output unit further outputs the second object-sensing signal when the second judging unit judges that an object is present in the second space.

* * * * *